UNITED STATES PATENT OFFICE.

EMIL TOTH, OF CHICAGO, ILLINOIS.

PREPARING A PRESERVED-MEAT COMPOUND.

949,336.　　　　　Specification of Letters Patent.　　Patented Feb. 15, 1910.

No Drawing.　　Application filed May 7, 1909. Serial No. 494,608.

*To all whom it may concern:*

Be it known that I, EMIL TOTH, a citizen of the United States, residing at Chicago, county of Cook, and State of Illinois, have invented an Improvement in Preparing a Preserved-Meat Compound, of which the following is a specification.

My invention relates to an improved process of preparing a preserved meat compound and has for its object the production of a palatable and nutritious compound which may be kept for a long time.

The invention consists in the compound and method herein described and claimed.

In the preferred method of preparing the food I proceed as follows: To 3/4 of a pound of chopped pork and 1/4 of a pound of chopped beef, I add 3 ounces of rice, 2 ounces of onion, 1/20 of an ounce of ground allspice, and 1/20 of an ounce of salt, all thoroughly mixed together. Then I take a cabbage head which has been soured whole with sauer kraut, and take it apart preserving the leaves whole as nearly as possible. The above mixture is separated into convenient quantities and rolled in the cabbage leaves. These rolls are then placed in water and boiled for one-half of a day. When almost done 1 pound of sauer kraut and 1 ounce of tomato is added and all permitted to boil for another hour. In the meantime a sauce should be prepared from 1/4 of a pound of lard and 2 ounces of flour browning the mixture while it is being stirred and adding 1/25 of an ounce of paprica and 1 ounce of chopped onions. The meat rolls are now removed from the mixture in which they were prepared and the sauce added to it with 1/20 of an ounce of cumin, and the mixture boiled for one-half of an hour while being well stirred. Then the meat rolls are replaced in the mixture which is again brought to a boil when the mixture is placed in cans or other receptacles which are immediately sealed airtight. The product is now ready for shipment and use and will be found to be highly palatable and nutritious and will keep for a long time.

While I have described in detail the preferred method and proportions for preparing this product, these may be varied to some extent without departing from the spirit of the invention. I, therefore, do not wish to be limited to the exact steps and proportions of ingredients set forth, but—

What I claim as new and desire to secure by Letters Patent is:

1. The process of preparing a meat product which consists in preparing rolls of a mixture of chopped pork and beef with rice, onion, allspice and salt, wrapped in soured cabbage leaves; boiling these rolls until nearly done and then adding sauer kraut; removing the meat rolls and adding brown flour and lard, with chopped onion paprica and cumin and boiling; replacing the meat rolls and bringing to a boil; and then sealing the product in air excluding receptacles, substantially as described.

2. The process of preparing a meat product which consists in preparing rolls of a mixture of the following ingredients; chopped pork 3/4 of a pound, chopped beef 1/4 of a pound, 3 ounces of rice, 2 ounces of onion, 1/20 of an ounce of allspice, 1/20 of an ounce of salt wrapped in sour cabbage leaves; boiling these rolls for substantially a half a day and then adding 1 pound of sauer kraut and 1 ounce of tomato and boiling for one hour; removing the meat rolls and adding a sauce consisting of the following ingredients; flour 2 ounces, lard 1/4 of a pound, chopped onion 1 ounce, paprica 1/25 of an ounce and cumin 1/20 of an ounce, all browned together; boiling this mixture for a half an hour; replacing the meat rolls and bringing to a boil and then immediately sealing the product in air excluding receptacles, substantially as described.

In testimony whereof I have signed my name to this specification in the presence of two subscribing witnesses.

EMIL TOTH.

Witnesses:
　JOSHUA R. H. POTTS,
　W. C. SMITH.